UNITED STATES PATENT OFFICE.

JOHN EVERSHED, OF KENLEY, ENGLAND.

ADHESIVE COMPOUND.

SPECIFICATION forming part of Letters Patent No. 629,006, dated July 18, 1899.

Application filed May 10, 1899. Serial No. 716,305. (No specimens.)

*To all whom it may concern:*

Be it known that I, JOHN EVERSHED, manufacturing chemist, a subject of the Queen of Great Britain, residing at Kenley, in the county of Surrey, England, have invented a new and useful Adhesive, of which the following is a specification.

My invention relates to the manufacture of a new adhesive material or gum which is applicable to most of the purposes for which various gums and adhesive substances are used and possessing advantages, inasmuch as it is capable of being made particularly clear and bright, is odorless, not liable to spontaneous fermentation, and is non-hygroscopic, and can be produced at a relatively low price. It is therefore greatly superior to some of the adhesives heretofore in general use.

I have discovered that a viscous product is formed when one of the groups of carbohydrates known as "sugar" is acted upon by boracic acid and an alkaline earth. According to my invention I employ one of the well-known carbohydrates of the sugar group—such as glucose, maltose, sucrose, levulose, invert sugar, treacle, molasses, beet-sugar, or cane-sugar. In actual practice I find it most advantageous to use glucose with boracic acid, and of the alkalies or alkaline earth I prefer to use calcined magnesia in about the following proportions: glucose, one hundred and twelve (112) pounds; boracic acid, forty to fifty (40 to 50) pounds; calcined magnesia, thirty to forty (30 to 40) pounds. I dissolve the glucose in four gallons of water, for that purpose raising the temperature to about 60° centigrade, and run the solution into, preferably, a wooden mixing-vat. I then add the boracic acid and calcined magnesia, both in the state of powder, in small quantities alternately, so that there may not at any time be too great an excess of either of them, stirring all the time until they are thoroughly incorporated. During the operation the temperature rises and care must be exercised not to allow it to rise above 90° centigrade, as any increase of temperature above this would damage the color of the product. To prevent such undue rise of temperature, I find it sufficient to add the materials slowly, and in case of necessity cold water or ice may be added. The use of metallic vessels and implements is to be avoided on account of the chemical action between a metallic surface and the mixture.

The above formula is intended for the production of gum for ordinary purposes, and I use glucose in preference to any of the other saccharine substances mentioned, principally on account of its low price and also because it yields very satisfactory results.

If it is desired to make a gum of special clearness and brightness, larger proportions of boracic acid and magnesia must be used, varying according to the particular circumstances up to as much as eighty-four (84) pounds of boracic acid and up to seventy (70) pounds of calcined magnesia, and sufficient water added to reduce the density to about 60° Twaddle. The proportions may be varied within wide limits, according to the nature and quality of the saccharine matter and of the alkali used and according to the qualities required in the product. As an example of an equivalent alkaline earth I mention lime.

I am aware that heretofore it has been proposed to use sugars, such as glucose and grape-sugar, in connection with boracic acid and a soluble alkali—such as caustic-soda lye, ammonia, alum, and soda—to make a mucilage; but mucilage so made is of inferior cementing power, is quite hygroscopic, and is a slow drier. The novelty of my invention consists in the employment of an alkaline earth in conjunction with boracic acid and one of the sugars.

Having now described my invention, what I claim, and desire to secure by Letters Patent of the United States, is—

1. An adhesive compound resulting from the mixture of glucose, boracic acid, and calcined magnesia, substantially as set forth.

2. An adhesive compound resulting from the mixture of one of the carbohydrates known as sugars, boracic acid, and calcined magnesia, substantially as set forth.

3. An adhesive compound resulting from the mixture of glucose, boracic acid, and an alkaline earth, substantially as set forth.

4. An adhesive compound resulting from the mixture of one of the carbohydrates known as sugars, boracic acid, and an alkaline earth, substantially as set forth.

In testimony whereof I have hereunto set my hand in the presence of two witnesses.

JOHN EVERSHED.

Witnesses:
NEWELHAM BROWNE,
WILMER M. HARRIS.